United States Patent [19]

Zwarun

[11] 4,187,799

[45] Feb. 12, 1980

[54] TEMPERATURE INDICATOR

[75] Inventor: Andrew A. Zwarun, Albertson, N.Y.

[73] Assignee: Propper Manufacturing Co., Inc., Long Island City, N.Y.

[21] Appl. No.: 898,789

[22] Filed: Apr. 21, 1978

[51] Int. Cl.$^2$ ............................................. G01K 11/06
[52] U.S. Cl. ........................................ 116/217; 73/358
[58] Field of Search ................ 116/114 Y, 114.5, 217; 73/358

[56] References Cited

U.S. PATENT DOCUMENTS

| | | | |
|---|---|---|---|
| 1,191,572 | 7/1916 | Davis | 116/114 Y |
| 1,779,066 | 10/1930 | Halsey | 116/114 Y |
| 3,192,771 | 7/1965 | Stearns | 73/358 |
| 3,518,961 | 7/1970 | Kovac | 116/114.5 |
| 3,618,558 | 11/1971 | Tepfer | 116/114.5 |
| 4,114,443 | 9/1978 | Clark | 116/217 X |

Primary Examiner—Donald O. Woodiel
Attorney, Agent, or Firm—Amster, Rothstein & Engelberg

[57] ABSTRACT

A temperature indicator adapted to be attached to an object to be monitored consists of a housing containing a temperature responsive material and an embedded indicating object. Upon reaching the appropriate temperature, the temperature responsive material flows, allowing both the indicating object and a portion of the temperature responsive material to descend into the lower portion of the housing. Upon cooling the temperature responsive material resolidifies in the lower portion of the housing, thus providing a permanent record that the desired temperature has been reached.

1 Claim, 5 Drawing Figures

TEMPERATURE INDICATOR

The present invention relates to a temperature indicator and more particularly to a temperature indicator which may easily be attached to an object to monitor the temperature of a wash solution to which the object is exposed, and to provide a permanent record that a preselected temperature has been reached or surpassed.

Many laboratory items are required to be subject to a certain temperature to ensure adequate sanitizing. This is often done as part of the between-use washing of the items. It is now generally recognized that good laboratory practice requires animal cages for the keeping of experimental animals to be sanitized. Proposed government regulations for good laboratory practice and established accrediting bodies require that animal cages, as well as ancillary equipment, be washed and/or rinsed using water that is at a temperature of 83° C. (180° F.) or higher for a sufficient period of time to assure destruction of most pathogenic organisms. It is also desirable that permanent records be maintained of all cleaning and maintenance operations.

Current temperature monitoring practice consists of monitoring water temperature by means of mechanical temperature probes or with thermometers. These methods are subject to several drawbacks. They are subject to malfunction or miscalibration and thus can produce inaccurate readings. Very often the mechanical devices are not located inside the actual washing site or on the items being washed. In these cases, it is impossible to determine the exact temperature to which an item has been exposed. A temperature indicator located in a tank under the washer, for example, may not be monitoring the temperature of the water actually contacting the items to be sanitized, as there is often a large drop in water temperature as the water passes through the equipment. The use of thermometers brings with it the additional danger of breakage, as the thermometers are often fragile as well as expensive to replace.

Most often records are not kept of sanitizing procedures, and when records are kept they are often inaccurate or incomplete. Furthermore, after the object to be sanitized leaves the sanitizing cycle, it is impossible to determine by simple inspection of the object whether or not it has been sanitized according to required standards. All these deficiencies produce doubts as to whether an object has been sanitized and inhibit the collection and maintenance of accurate records.

While there have been numerous attempts to provide a temperature indicator which can be applied directly to the object sought to be monitored and which will provide a permanent record of reaching a given temperature, these attempts have not been successful. Deficiencies, such as a sensitivity to cleaners or steam, the use of toxic chemicals, the requirement of interpretation of color changes, or poor storage characteristics have been present.

It is an object of the present invention to overcome the deficiencies of the prior art by providing an improved temperature indicator for insuring that the correct temperature has been reached in the environment of the object sought to be monitored.

A further object is to provide a temperature indicator that functions also as a permanent record that the required temperature condition has been met. A still further objective is to provide a temperature indicator that is inexpensive and safe to handle.

Yet another object of the present invention is to provide a temperature indicator which may be stored for extended periods of time without degradation of the performance characteristics of the device, and can be stored in a way which temperatures experienced during storage which are above the temperature sought to be monitored will not cause the indicator to operate.

The temperature indicator of this invention consists of a housing in which a temperature responsive material is contained. An indicating object may also be located within the housing, supported by the temperature responsive material. It is the change in position of the temperature responsive material and/or indicating object upon attainment of the desired temperature which signals that the temperature condition desired has been met.

The housing of the temperature indicator contains two sections. The first section is designed to house the temperature responsive material and indicating object prior to actual indication, and may be adapted to prevent observation of the enclosed materials. This eliminates observer error by observation of the indicating object prior to actuation. The second section of the housing is designed to receive the indicating object and/or temperature responsive material when the desired temperature has been attained, and is adapted to allow monitoring as to whether or not the indicating object and/or temperature responsive material has been received.

The indicator is placed directly on the object to be sanitized by appropriate support means. This ensures that the temperature indicator is subjected to the precise temperature that the monitored object experiences as it travels through the washing/sanitizing cycle. As the object and the attached temperature indicator become heated, the temperature responsive material begins to soften. Depending on the exact temperature responsive material chosen and other physical factors, the point at which the temperature responsive material becomes fluid enough to allow the indicating object to move into the monitoring portion of the temperature indicator is variable. Prior to the attainment of this temperature, the temperature responsive material remains solid, by which is meant that it is essentially non-flowable, so that it can remain in a fixed position for extended lengths of time without releasing the indicating object. When the sanitizing operation is completed and the correct temperature has been reached, the indicating object plus a portion of the temperature responsive material can be observed within the second section of the temperature indicator housing.

The temperature indicator may remain with the object as a permanent indication to all personnel that the object has been sanitized, or it may be removed and filed with the appropriate records. In either case, upon cooling, the temperature indicator provides a temperature record that is permanent, positive and highly visible.

The above brief description as well as further objects and advantages of the invention will be more fully appreciated with reference to the following detailed description of a preferred, but nonetheless illustrative, embodiment when taken in conjunction with the following drawings, wherein.

Figure 1:
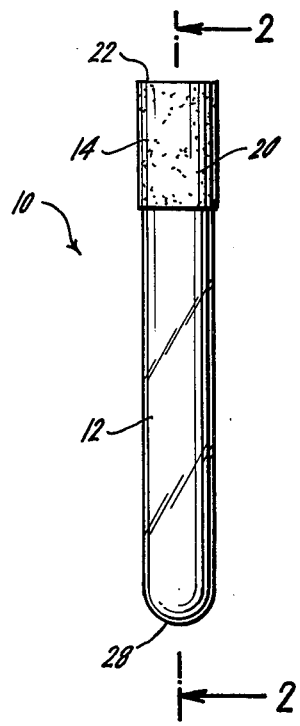
FIG. 1 is a plan view of the temperature indicator of the invention before exposure to the desired temperature.
Figure 2:
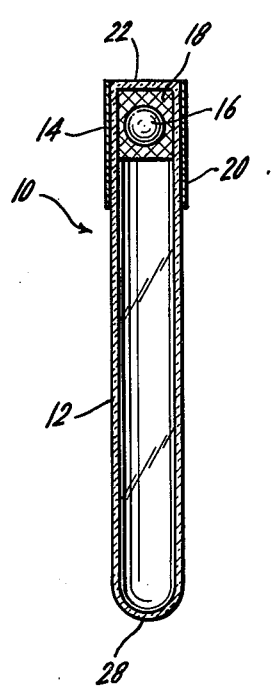
FIG. 2 is a sectional view of the temperature indicator taken along line 2—2 of FIG. 1 before exposure to the desired temperature.

Referring to FIGS. 1 and 2, temperature indicator 10 consists of clear housing 12 constructed of a suitable transparent material, such as plastic or glass. Temperature responsive material 18 and embedded indicating object 16 are located within upper portion 14 of the housing. Opaque coating 20 covers upper portion 14 of the housing to prevent the observation of either temperature responsive material 18 or indicating object 16 prior to indication of the appropriate temperature.

Figure 3:
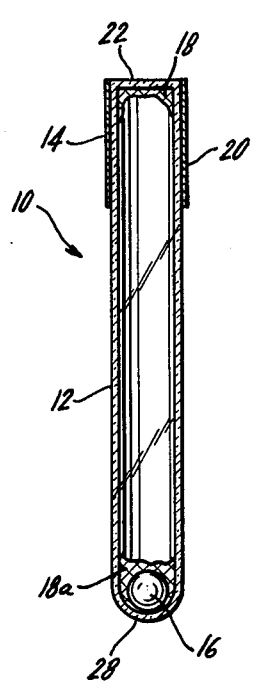
FIG. 3 is a sectional view of the temperature indicator taken along line 2—2 of FIG. 1 showing the final position of the indicating device after the desired temperature has been reached.

FIG. 3 shows the temperature indicator of FIG. 1 after the appropriate temperature has been reached. Temperature responsive material 18 has reached a point at which it has become fluid enough to loosen indicating object 16, which is pulled by gravity to the bottom of the indicator. Indicating object 16 is preferably made of a dense material to ensure a rapid fall. A portion 18a of the temperature responsive material 18 also falls with indicating object 16, thus providing added visibility. While not shown, the temperature responsive material may leave streaks upon the sides of the housing. Those streaks also increase visibility and remain even upon reheating of the temperature indicator, thus providing additional assurance of permanency. Upon cooling, temperature responsive material 18a resolidifies, securing indicating object 16 to the bottom of the temperature indicator. This allows the temperature indicator to be removed from the object to which it was mounted if it is desired to keep the temperature indicator as part of the permanent records to verify that the object to which the temperature indicator was attached was subjected to a desired temperature environment. Since the indicating object and temperature responsive material are firmly secured to the bottom of the indicator, the temperature indicator can alternatively be left on the monitored object to inform personnel that the object has been sanitized, as the object can be moved and repositioned without fear that the positive indication of the temperature indicator will be disturbed.

The temperature indicator illustrated in the figures may be economically manufactured from a common glass vial. Such glass vials are typically manufactured with a flat closed end, which becomes top 22 of the temperature indicator, and open end 28, which is shown in the figures as it appears after sealing as the lower end of the temperature indicator. Indicating object 16, which is a metal ball, is put into the vial and temperature responsive material 18 is introduced in a molten state. Upon cooling, temperature responsive material 18 secures indicating object 16 within portion 14 of the clear housing. Suitable refined waxes for use in the device are well known in the art. A suitable dye may be added to the wax to improve its visibility.

After indicating object 16 and temperature responsive material 18 have been introduced into the vial, the open end of the vial is closed by heating and melting to form sealed lower end 28. This produces a totally enclosed housing in which the contents are unaffected by the elements of the surrounding environment. The upper end of temperature indicator 10 is then given a coating 20 of an opaque lacquer which can withstand both the temperature to be experienced and the actions of water and cleansing agents.

Figure 4:
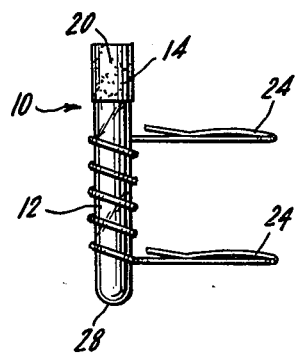
FIG. 4 shows the temperature indicator of FIG. 1 mounted in a typical holder.
Figure 5:
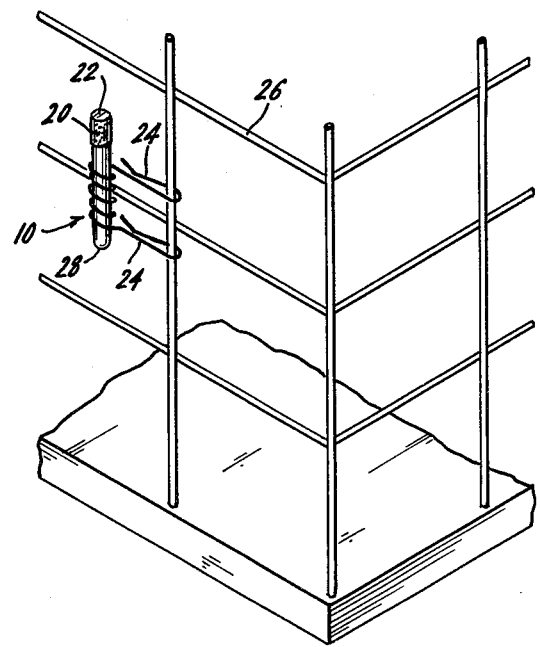
FIG. 5 is a perspective view of the temperature indicator of FIG. 1 installed on a section of a typical laboratory cage prior to being subjected to a washing/sanitizing treatment sought to be monitored.

FIGS. 4 and 5 show how the temperature indicator of FIG. 1 can be mounted. Typical wire clamp 24 consists of a spiral wire with the two ends folded to make clamp-like arms. After temperature indicator 10 is inserted within the spiral, clamp 24 is attached to the object to be monitored, such as laboratory cage 26. The only precaution to be observed is that temperature indicator 10 must be mounted essentially upright with its opaque section at the top to allow the indicating object and temperature responsive material to fall under the influence of gravity.

In storage, the indicator may be kept upright with lower end 28 at the top. This prevents the temperature-sensitive material and indicating object from changing position when exposed to temperatures above the indicating temperature of the unit, and ensures that the indicator will be ready for use at any time. Since wax is a stable compound and relatively non-toxic, the temperature indicator can be stored for a long period of time and can be handled safely, without fear of the release of dangerous chemicals or vapors if a unit is accidentally broken.

Although the invention has been described as applied to a specific embodiment, it will be clear that many modifications can be easily performed within the scope of the invention claimed.

What is claimed is:

1. A temperature indicator for providing a permanent indication that a given predetermined temperature has been reached, comprising a transparent tube of substantially uniform cross-section, one end of said tube having an opaque coating thereon, a ball of dense material having a diameter occupying a substantial portion of the cross-section of said tube positioned within said tube, a temperature responsive wax positioned within said tube at the opaque end thereof, said wax being in contact with said opaque end and in contact with said ball so as to retain said ball at said opaque end when ambient temperature is below a predetermined level, said wax being adapted to melt at a predetermined temperature releasing said ball, a dye in said wax imparting a distinctive color to said wax, and means for securing said tube to an object in operative position with said opaque end up so that, upon attainment of said predetermined temperature, said ball moves promptly and positively into the transparent portion of said tube, the passage of said ball in said transparent portion depositing portions of said dyed wax on the interior of said tube to provide an indication that said temperature has been attained.

* * * * *